United States Patent [19]

Phillippi

[11] 3,985,526
[45] Oct. 12, 1976

[54] DUST COLLECTOR WITH SPACED VOLUTES

[75] Inventor: John F. Phillippi, Mentor, Ohio

[73] Assignee: Aerodyne Development Corporation, Cleveland, Ohio

[22] Filed: Jan. 8, 1976

[21] Appl. No.: 647,370

[52] U.S. Cl. .................................. 55/261; 55/454; 55/459 B; 209/144
[51] Int. Cl.² ........................................ B01D 45/12
[58] Field of Search .................. 55/261, 459 B, 345, 55/454; 209/144

[56] References Cited
UNITED STATES PATENTS

| | | | |
|---|---|---|---|
| 3,744,220 | 7/1973 | Klein | 55/261 |
| 3,791,110 | 2/1974 | Klein et al. | 55/261 |
| 3,917,568 | 11/1975 | Klein et al. | 55/261 |

Primary Examiner—Bernard Nozick
Attorney, Agent, or Firm—Baldwin, Egan, Walling & Fetzer

[57] ABSTRACT

In this application there is presented a mechanical dust collector which includes an elongated cylindrical housing at the bottom of which a dirty gas stream enters through a primary volute which directs the incoming stream to a cup shroud mounted in the housing axially thereof and generally centrally of the volute, this volute being closed at the bottom and open at the top only to the shroud, whose center is closed so that the inlet stream is given a helical upward draft which throws the solid particles out of the stream toward the interior wall of the housing. Then a secondary volute is provided at the opposite end of the housing leading tangentially from a secondary inlet, this secondary volute being closed at the top and open at the bottom only at an annular space adjacent the inner wall of the housing so that a secondary stream is provided there driving smoothly down the inner wall of the housing and causing the fine solid particles to pass downwardly and below a solid ground which extends horizontally outwardly beyond the cup shroud and which terminates short of the inner wall of the housing. The clean gas passes out the top of the housing through a central outlet.

2 Claims, 8 Drawing Figures

DUST COLLECTOR WITH SPACED VOLUTES

Dust collectors are well known similar to this invention except that the inlet stream of dirty gas is thrown outwardly by inclined vanes and a secondary stream is provided at the upper portion of the housing and enters through tangential jets. These prior devices cause excessive turbulence inside of the housing and the present invention is provided to do away with such turbulence, and still provide an efficient dust separation.

Other objects and advantages of the invention will be apparent from the accompanying drawings and description and the essential features thereof will be set forth in the appended claims.

In the drawings,

FIG. 7 is a fragmental sectional view similar to the lower portion of FIG. 3 but showing a modification; while

Referring to FIGS. 1 through 6, an elongated cylindrical housing 10 is closed except for the primary inlet 11, the secondary inlet 12, and the outlet 13.

Figure 2:
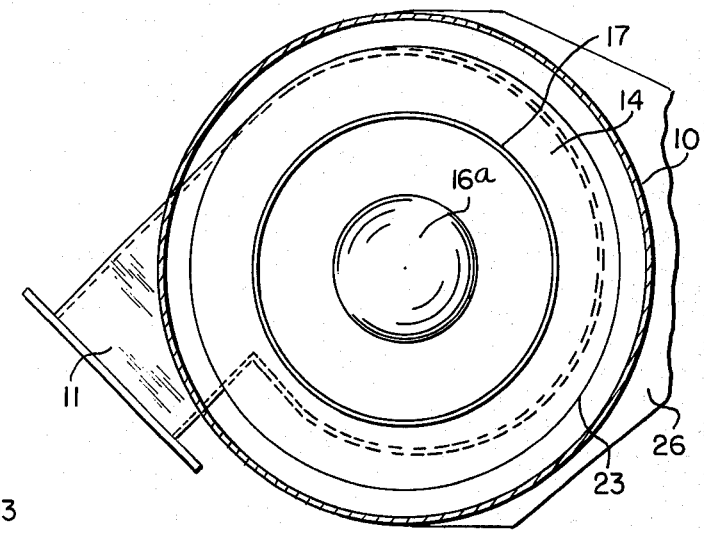
FIG. 2 is a sectional view of the same taken along the line 2—2 of FIG. 1.
Figure 1:
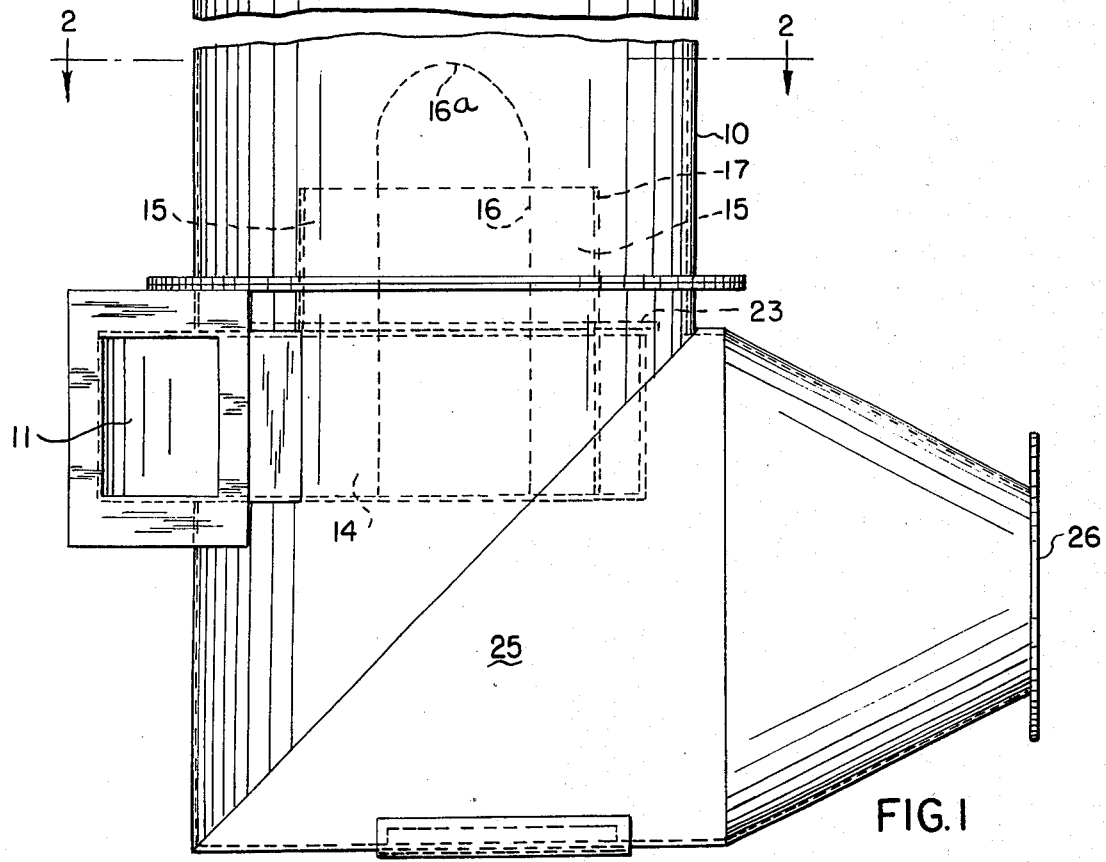
FIG. 1 is a side elevational view of one embodiment of this invention.
Figure 3:
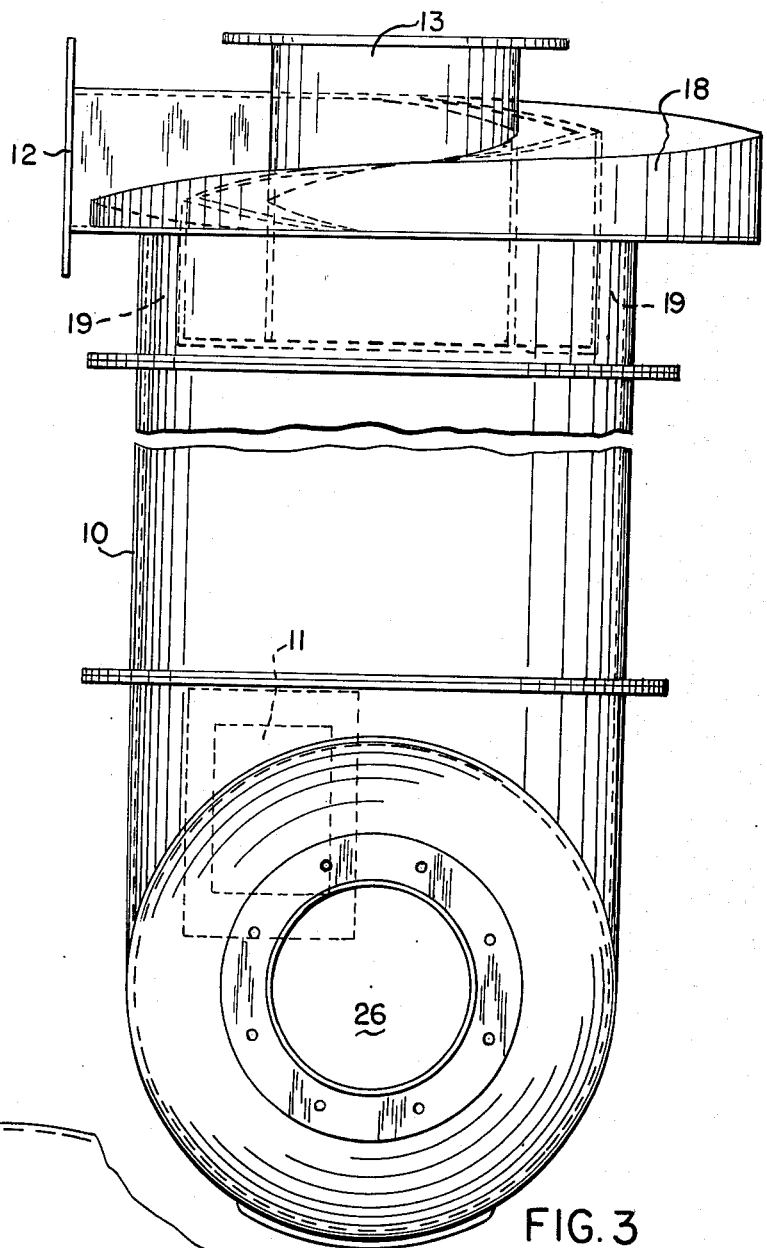
FIG. 3 is a side elevational view taken from the left-hand side of FIG. 1.
Figure 4:
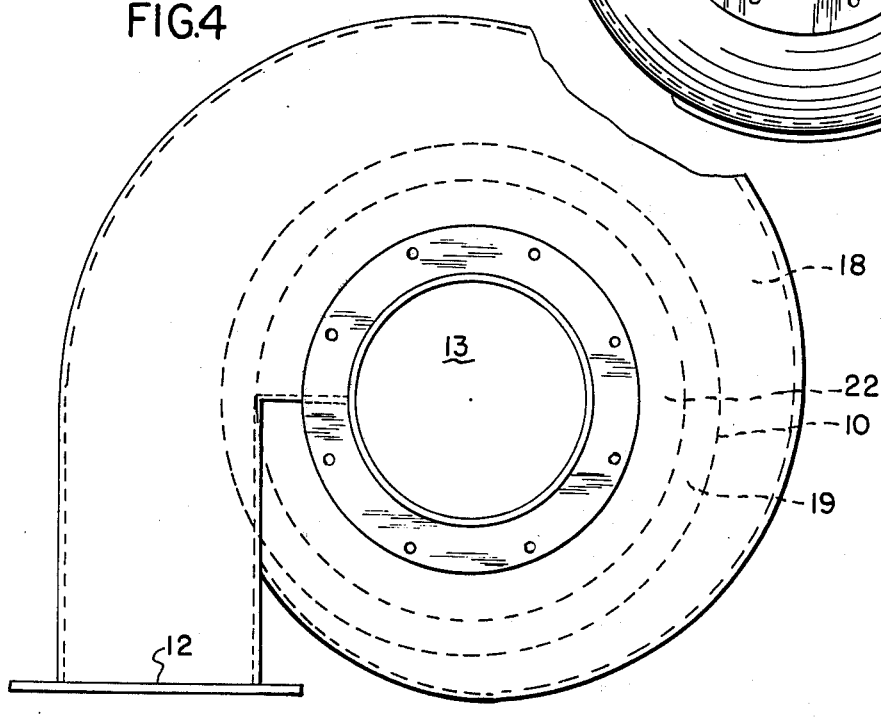
FIG. 4 is a top plan view of the device of FIGS. 1 and 3.

The primary inlet 11 for a contaminated gas stream, as seen in FIGS. 1 and 2, enters a primary volute 14 tangentially of the same and this volute is closed at the bottom and open at the top only at an annular passageway 15 between an impervious generally cylindrical central filler 16 which is closed at the top by a generally spherical or ellipsoidal member 16a, on the inside, and outwardly by a cup shroud 17 which is upstanding and rigid with the bottom of the volute 14. It results from this construction that the entering inlet stream from 11 is given a smooth circular spinning action as it leaves the cup shroud 15 which throws the solid particles in the dirty gas stream radially outwardly toward the inner surface of the housing 10, causing this stream to take a helical path upwardly.

Figure 5:
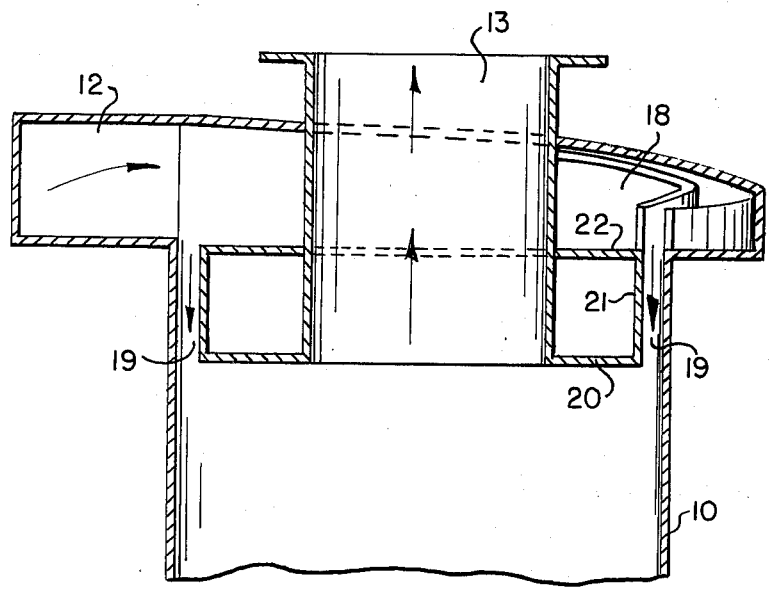
FIG. 5 is a central sectional view of the upper portion of FIG. 1.

The secondary inlet 12 enters tangentially of a secondary volute 18 which is closed at the top radially outwardly from the outlet 13 except for an annular passageway 19 which opens downwardly closely along the inner wall of the housing 10 so that this secondary stream is given a smooth helical flow downwardly adjacent the inner wall of housing 10 as will be clearly seen in FIG. 5. It will be noted here that a bottom member 20 extends from the walls of outlet 13 radially outwardly to join a vertical cylindrical wall 21 which forms the inside of the annular passageway 19. Then an annular member 22 closes the volute 18 at the bottom from the outlet 13 outwardly to the passageway 19.

Figure 6:
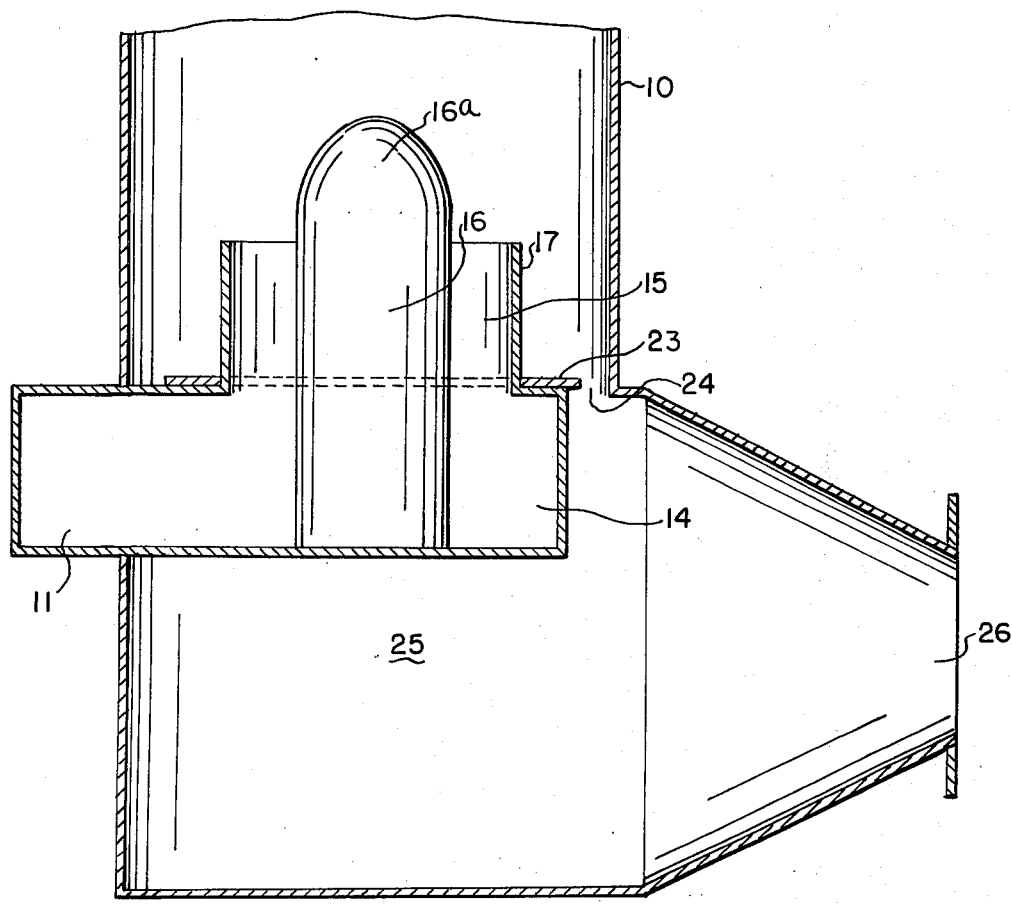
FIG. 6 is a central sectional view of the lower portion of FIG. 1.

Thus, the solid particles thrown outwardly toward the inside surface of the housing 10 where it leaves the cup shroud 15 is counteracted by the secondary stream entering at 12 and passing downwardly at the annular passage 19 close to the inner wall of the housing 10 sweeps the inner wall carrying the solid particles downwardly. As best seen in FIGS. 1 and 6, a solid ground is provided by a horizontally extending plate 23 extending radially outwardly from the cup shroud 15 at about the level of the top cover of the volute 14. Annularly outside of the solid ground is an open passageway 24 which permits the solid particles to drop down into a receiving chamber 25 in the bottom of the housing 10. This dust may be allowed to pass out at a lateral opening 26 or the receiving chamber 25 might be completely closed and otherwise provided with means for cleaning it out.

The function of the solid ground at 23 will be understood by those skilled in this art. It aids in reversing the direction of the helical stream coming down the inside surface of the housing 10 from the annular space 19 and turns the same back upwardly.

The length of the wall 21 limiting the extent of the annular passageway 19 may vary somewhat but it should be of sufficient length to direct the secondary stream closely down the inside wall of the housing 10. As shown in FIG. 5, it is approximately the vertical depth of the inlet opening at 12 but it could be a little longer than this.

The preferred relationship between the volume of the primary inlet stream at 11 and the secondary inlet stream at 12 is about 55 percent primary and 45 percent secondary. However, the primary stream might run from 45 percent to 75 percent of the total input while the secondary stream might vary from 55 percent to 25 percent.

Figure 8:
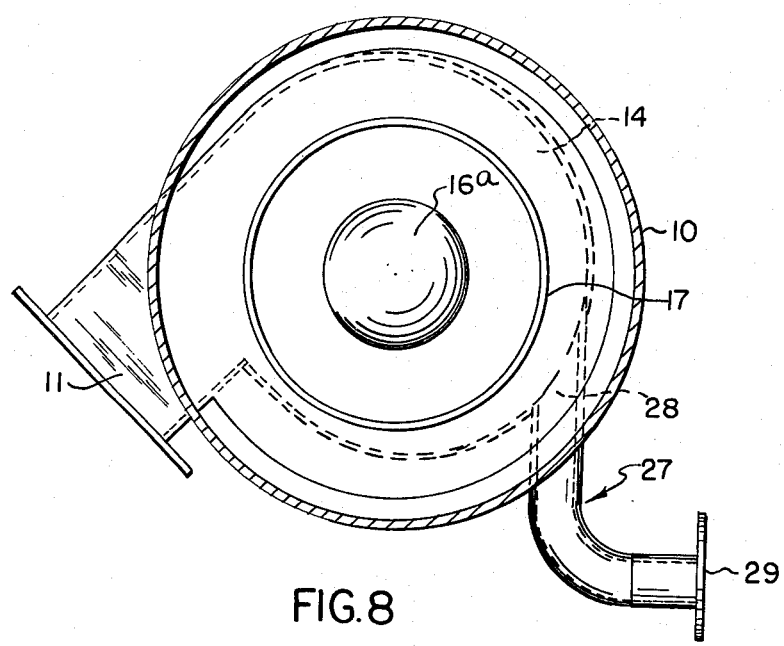
FIG. 8 is a sectional view of the same taken along the line 8—8 of FIG. 7.
Figure 7:
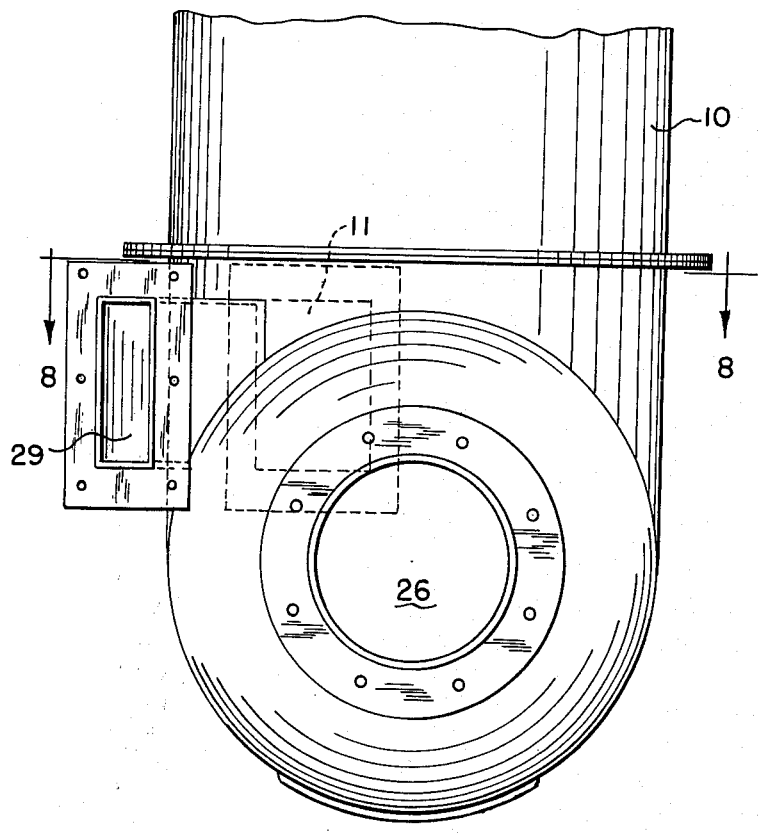

The modification shown in FIGS. 7 and 8 provides a skimmer which would remove large particles which would be of benefit when high grain loadings are encountered. This involves a passageway 28 which communicates tangentially with the volute 14 and preferably at least about 180° from the inlet 11. Preferably also the volute has a vertical depth about the same as the vertical depth of the passageway. The passageway 28 leads to an outlet 29 for removal of the large particles. Where the primary inlet stream contains a large volume of large size particles, the use of this skimmer would increase efficiency.

The operation of this dust collector should now be apparent. The primary inlet stream at 11 is swirled in a smooth manner by the primary volute 14 and passes upwardly through the cup shroud 17 exteriorly of the filler 16 to cause a primary helical stream to move upwardly toward the outlet 13 while throwing solid particles toward the housing 10. Then the secondary inlet stream 12 is caused to swirl by the volute 18 and passes downwardly through the annular space 19 which directs a downwardly directed helical stream along the inside face of the housing 10 brushing the collected solid particles downwardly past the solid ground 23 to fall into the hopper 25.

What is claimed is:

1. Apparatus for collecting finely divided particles contained in a gaseous medium comprising an elongated cylindrical housing closed except for inlets and outlets specifically defined herein, there being an inlet for primary flow of a contaminated gas stream near one end of said housing, a primary volute in said housing communicating smoothly with said inlet, a cylindrical cup shroud mounted in said housing axially of said housing and generally centrally of said volute, means closing the bottom of said volute, said volute at its top being open to said shroud but closed at its top outside of said shroud, a filler member fixed axially of said cup shroud and closing the central portion thereof from the bottom of said volute to the top of said cup shroud and having a generally elliptical head extending beyond said cup shroud, thus providing a primary rotational flow upwardly and throwing entrained particles centrifugally outwardly toward said housing, there being a second inlet for a secondary gaseous stream near the other end of said housing, a secondary volute in said housing communicating tangentially with said second inlet, a cylindrical sleeve shroud of lesser diameter than said housing mounted concentrically in said housing and generally centrally below said second volute, an imperforate cylindrical clean gas outlet fixed in said housing axially thereof and extending unobstructed through the extent of said sleeve shroud and said secondary volute and out through said other end of said housing, said sleeve shroud spaced from the wall of said housing and there providing an annular passageway between said sleeve and said housing, said secondary volute at the top being closed outside of said gas outlet, said secondary volute at its bottom being open at said annular passageway between said sleeve shroud and said housing and being otherwise closed, there being means closing the space between said gas outlet and said sleeve shroud at the bottom of said sleeve shroud, thus providing a secondary rotational flow downwardly directed by said sleeve shroud adjacent the inner wall of said housing and carrying any separated particles there downwardly, a solid ground provided as an annular ring at right angles to the axis of said housing at about the bottom of said cup shroud and extending outwardly therefrom to a zone spaced from the wall of said housing and there leaving an annular discharge opening for the dropping of separated particles downwardly, and a sump associated with said housing beneath said discharge opening.

2. Apparatus for collecting finely divided particles contained in a gaseous medium as defined in claim 1, including means for skimming off large particles encountered in quantity at said inlet, including a passageway communicating tangentially with said primary volute and extending to a point exterior of said housing.

* * * * *